(12) United States Patent
Allen et al.

(10) Patent No.: US 6,811,267 B1
(45) Date of Patent: Nov. 2, 2004

(54) DISPLAY SYSTEM WITH NONVISIBLE DATA PROJECTION

(75) Inventors: William J. Allen, Corvallis, OR (US); Antonio S. Cruz-Uribe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/457,947

(22) Filed: Jun. 9, 2003

(51) Int. Cl.⁷ .......................... G03B 21/00; H04N 9/74
(52) U.S. Cl. ........................... 353/122; 348/589
(58) Field of Search ................. 353/28, 79, 122; 359/443, 630; 349/11; 348/584, 586, 589

(56) References Cited

U.S. PATENT DOCUMENTS

| | | | | |
|---|---|---|---|---|
| 5,276,523 A | * | 1/1994 | Kurematsu et al. | 348/745 |
| 5,690,492 A | * | 11/1997 | Herald | 434/20 |
| 5,913,727 A | * | 6/1999 | Ahdoot | 463/39 |
| 5,914,783 A | * | 6/1999 | Barrus | 356/614 |
| 5,967,636 A | | 10/1999 | Stark et al. | |
| 6,283,862 B1 | * | 9/2001 | Richter | 463/51 |
| 6,339,748 B1 | * | 1/2002 | Hiramatsu | 702/159 |
| 6,361,173 B1 | * | 3/2002 | Vlahos et al. | 353/97 |
| 6,538,814 B2 | * | 3/2003 | Hunter et al. | 359/449 |
| 6,598,979 B2 | * | 7/2003 | Yoneno | 353/122 |
| 6,616,284 B2 | * | 9/2003 | Yaniv et al. | 353/79 |
| 6,680,579 B2 | * | 1/2004 | Allen et al. | 359/443 |

* cited by examiner

*Primary Examiner*—Christopher Mahoney

(57) ABSTRACT

A display system includes an illumination source configured to produce visible and nonvisible radiation and to direct the visible and nonvisible radiation along an optical path; and a modulator disposed in the optical path configured to modulate the visible radiation to generate a visible image, and to modulate the nonvisible radiation to generate a nonvisible data stream.

35 Claims, 3 Drawing Sheets

┌────────────────────────────────┐ ─ 74
│   GENERATING VISIBLE AND       │
│   NONVISIBLE RADIATION         │
└────────────────────────────────┘
               │
               ▼
┌────────────────────────────────┐ ─ 76
│  SEQUENCING THE VISIBLE        │
│  RADIATION AND THE             │
│  NONVISIBLE RADIATION          │
└────────────────────────────────┘
               │
               ▼
┌────────────────────────────────┐ ─ 78
│   MODULATING THE VISIBLE       │
│   RADIATION TO GENERATE A      │
│   VISIBLE IMAGE                │
└────────────────────────────────┘
               │
               ▼
┌────────────────────────────────┐ ─ 80
│   MODULATING THE NONVISIBLE    │
│   DATA TO GENERATE A NONVISIBLE│
│   DATA STREAM                  │
└────────────────────────────────┘
               │
               ▼
┌────────────────────────────────┐ ─ 82
│   PROJECTING THE VISIBLE       │
│   IMAGE ONTO A DISPLAY SURFACE │
└────────────────────────────────┘
               │
               ▼
┌────────────────────────────────┐ ─ 84
│   PROJECTING NONVISIBLE DATA   │
│   ONTO A RECEIVER              │
└────────────────────────────────┘
```

DISPLAY SYSTEM WITH NONVISIBLE DATA PROJECTION

BACKGROUND

A variety of image projection systems have been used to enlarge a still or video image so as to enable the image to be viewed simultaneously by a large or small audience. While projection of only a visual presentation has traditionally been satisfactory, viewers have recently become more accustomed to multimedia presentations that may include audio, optional captioning, and/or the synchronization of multiple additional electronic devices with the presentation. It would be desirable to have a display system that permitted the transmission of data to support such multimedia effects without requiring additional cable connections between projection system components.

SUMMARY

A display system is provided that includes an illumination source configured to produce visible and nonvisible radiation, and a modulator configured to modulate the visible radiation to generate a visible image, and to modulate the nonvisible radiation to generate a nonvisible data stream.

BRIEF DESCRIPTION OF THE DRAWINGS

FIG. 4 is a flowchart demonstrating a method of temporally sequencing a visible radiation and nonvisible radiation, according to an embodiment of the present invention.

DETAILED DESCRIPTION

Figure 1:
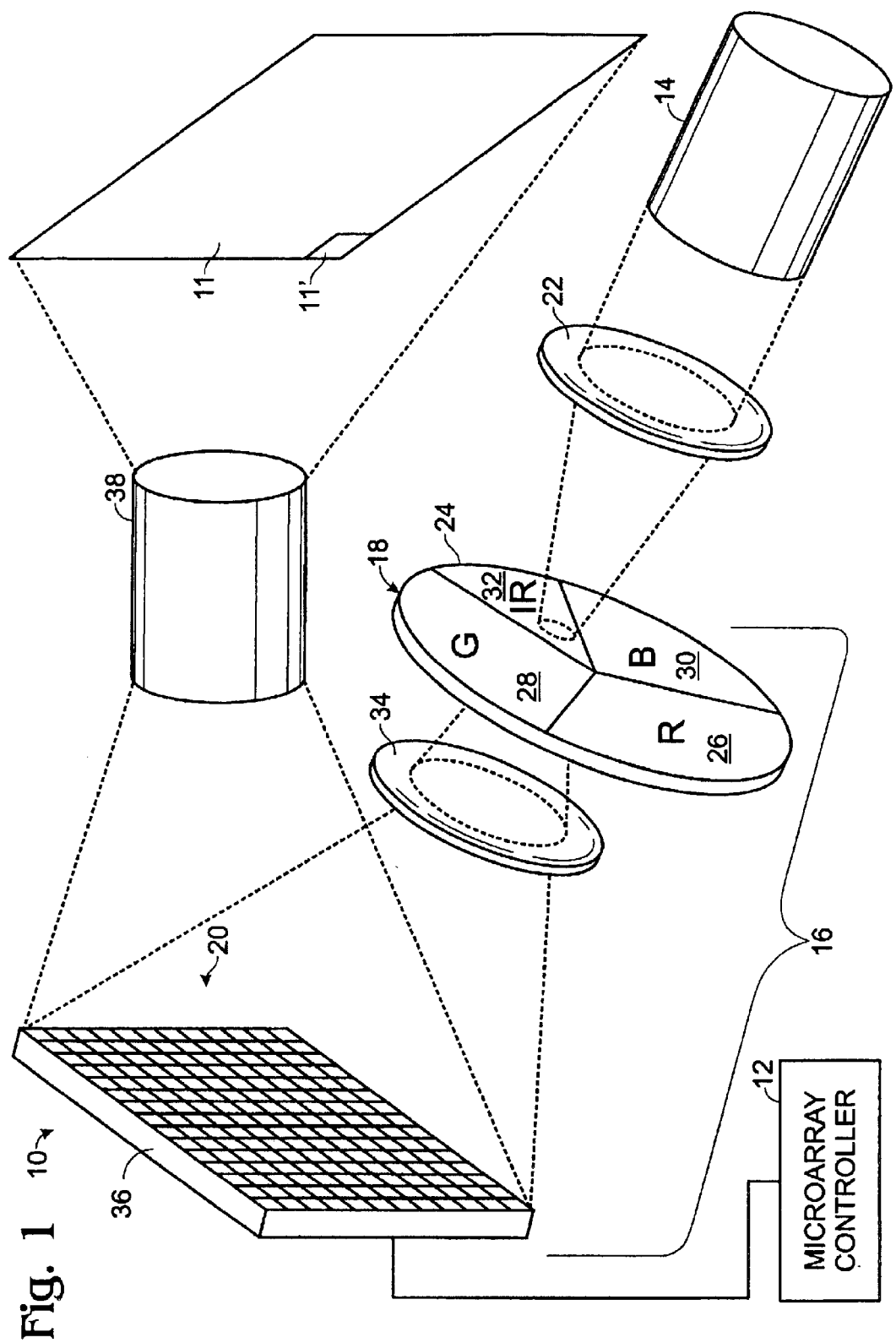
FIG. 1 is a partially schematic view of a projection engine according to an embodiment of the present invention.

In FIG. 1, a projection engine for a display system is shown generally at 10. The projection engine may be configured to direct and transmit radiation in the form of visible light to a display surface 11 to generate a projected image that corresponds to image data received from an associated controller 12. The projection engine may include an illumination source 14, and a modulator 16. The modulator may include a color-forming element 18, and an image-forming element 20, each of which may be considered to temporally and/or spatially modulate radiation from illumination source 14.

Any illumination source able to provide sufficient radiation to the modulator to generate a discernable visible image and a detectable nonvisible data stream is a suitable illumination source. Such sources include, for example, single white light sources (such as a mercury lamp, plasma lamp, incandescent lamp, etc.) and/or multiple white or single-color light sources (such as light-emitting diodes (LEDs), laser diodes, etc.). Illumination source 14 is depicted (for simplicity) as a single white light source.

The white light produced by illumination source 14 may be directed through a primary condenser lens 22, and thereby, configured for transmission through color-forming element 18. Color-forming element 18 is depicted in FIG. 1 as including a color wheel 24, although it should be appreciated that any mechanism for selecting the color of light projected is a suitable color-forming element. In FIG. 1, color wheel 24 is a rapidly rotating color filter array interposed between illumination source 14 and image-forming element 20. Color wheel 24 includes segments having different filtering properties. In particular, color wheel 24 includes a red segment 26 (which employs a red-transmissive filter), a green segment 28 (which employs a green-transmissive filter), and a blue segment 30 (which employs a blue-transmissive filter). As color wheel 24 is rapidly rotated, colored light may be sequentially projected onto the image-forming element. Where color wheel 24 further includes a data segment 32 that transmits a nonvisible radiation (for example infrared radiation), nonvisible data may be temporally sequenced, that is, projected in an alternating sequence with the visible light.

It should be appreciated that color-forming elements could be incorporated into the illumination source, for example, where the illumination source includes a red light source, a blue light source, and a green light source. Correspondingly, any color-forming element that is capable of selecting between at least one visible and one nonvisible band of radiation for subsequent manipulation by the image-forming element is a suitable color-forming element.

The radiation sequentially produced by color wheel 24 may then be passed through secondary optics 34 to direct and configure the radiation onto image-forming element 20. The image-forming element may take the form of a transmissive image-forming element, such as a liquid crystal display (LCD) panel. Alternatively, the image-forming element may be a reflective image-forming element, such as a digital micromirror device (DMD), a grating light valve (GLV), or liquid crystal on silicon (LCOS) device, among others. The projection engine depicted in FIG. 1 employs a micromirror array 36 that selectively reflects radiation incident thereon according to input received from a micromirror array controller 12.

Radiation reflected by micromirror array 36 may be directed through projection optics 38, that, in turn, direct and focus the radiation onto a display surface 11. In operation, rotation of color wheel 24 may be coordinated with the function of micromirror array 36 so that sequential red, green, and blue visible images are projected onto display surface 11. Where the color wheel includes a data segment, as described herein, the micromirror array may be adapted to project data onto the display surface during passage of nonvisible radiation to the micromirror array. This coordinated sequencing of red, green, and blue visible images with nonvisible data typically will occur quickly enough that a viewer's visual system integrates the sequential colors and perceives a full-color image.

During the rotation of color wheel 36, when data segment 32 is interposed in the optical path, nonvisible radiation is projected onto the micromirror array. For the purposes of discussion, data segment 32 may be considered to be transmissive of infrared radiation (IR). However, it should be appreciated that other types of radiation not readily perceived by the human eye may be used with similar effect.

The actual size of the color wheel section that includes the nonvisible filter segment may be varied, but is generally selected so that, during operational rotation of the color wheel, the interleaving of data by the data segment is not distracting to most viewers, and is typically not perceptible to most viewers. For example, the color wheel may include filter segments having the following filter segment sizes:

| Filter Segment | Size (in degrees) |
| --- | --- |
| Red | 150 |
| Green | 85 |
| Blue | 85 |
| Infrared | 40 |

Discrimination between the radiation transmitted through the individual filter segments may be enhanced where the red 26, green 28, and blue 30 segments of the color wheel block substantially all infrared radiation. Similarly, it may be advantageous to employ a data segment 32 that blocks substantially all visible radiation. Desired bandpass characteristics of the filter segments may be obtained by using a single filter having the desired spectral properties, or by combining two or more filters, such as by layering filters within the color wheel, so that the combined filters exhibit the desired filter properties.

While data segment 32 is interposed between illumination source 14 and the micromirror array 36, the micromirror array may reflect the infrared signal through projection optics 38 to a receiver 11' (or receivers) associated with the display surface. Using micromirror array 36, data may be encoded in the infrared signal by modulating the infrared beam produced by data segment 32. The encoded data thus may be projected as a stream of binary bits, where the presence or absence of the projected infrared beam corresponds to ones and zeros.

In one embodiment, data may be encoded in an infrared signal using pulse modulation. The particular encoding used may be dependant upon the type and sophistication of the devices used to receive and decode the infrared signal, and the time available for signal generation. For example, where the color wheel rotates at 7,200 rpm. If the micromirror array is configured to form from 0–6 infrared pulses (or bits of information) during the portion of the rotation while data filter 32 is interposed between the illumination source and the micromirror array, data transfer rates of 720 bits/sec may be achieved.

The nonvisible data stream may include a series of high speed data bursts, generally encoded via pulse modulation. Such bursts may be reformatted into a continuous signal when received. Alternatively, multiple data streams may be transmitted to multiple receivers simultaneously, by targeting distinct receivers with selected data streams using the ability of the micromirror device to optically address the projected infrared radiation. Such parallel data transmission may result in substantially higher data transfer rates. However, the parallel data may require serialization after reception.

It should be appreciated that it would be possible to increase the comparative size of the data segment of the color wheel to achieve in greater information bandwidth. However, this increase may come at the expense of intensity of visible light. Furthermore, even where the data filter occupies a relatively small percentage of the color wheel area, the resulting data transfer rates may transmit a significant amount of information to a receiver, as indicated above.

Figure 2:
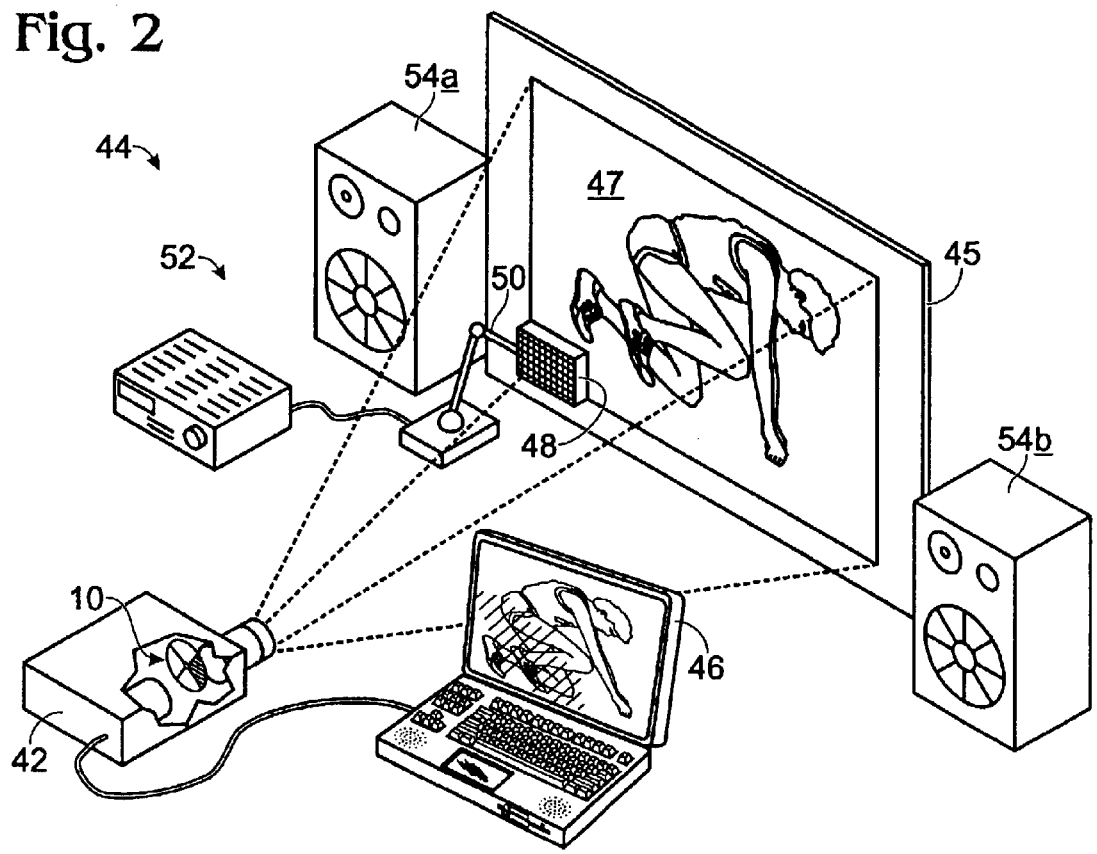
FIG. 2 is an isometric view of a display system that includes the projection engine of FIG. 1

Referring now to FIG. 2, it will be appreciated that projection engine 10 may be incorporated in a projector 42 that forms a part of a display system 44. Display system 44 may also include a display screen 45, and an associated computer 46. Computer 46 may send image data to projector 42, where it may be used by the microarray controller to direct operation of a micromirror array in producing an image 47 on display screen 45.

Where the display system utilizes a passive projection screen, the display screen may include a somewhat reflective surface. Such screen surfaces may incorporate a pigment, dye, or other colorant, or a light-scattering material or a retroreflective substance, such as glass beads, so as to enhance the performance of the screen.

Since the micromirror array may be capable of spatially addressing the infrared signal, the micromirror array may be used to direct the generated infrared data stream(s) to one or more spatially-separated receivers. The receivers typically are configured to receive infrared signals projected by the projection engine. For example, appropriate receivers may include photodiodes or light-receiving diodes (LRDs), among others, that exhibit an appropriate response. Alternatively, appropriate receivers may include phototransistors or other types of optoelectronic devices. The type and configuration of receivers included in the display system may be dependant upon the type and configuration of the projection engine included in the display system. Where the display system includes a rear projection display system, such receivers may be located on the back of the screen with respect to the viewer. Alternatively, where the display system includes a front projection display system, the receivers may be oriented on the front side of the screen.

Where the display surface is a passive screen, the receiver may either be incorporated in the screen itself, or may be a separate (but associated) receiver that may be placed within the area of the projected data so that the data stream is at least partially incident upon a receiver. As depicted in FIG. 2, a receiver array 48 may be mounted on a moveable arm 50 so that the receiver may be appropriately positioned relative to a projected image 47. Such placement may be sufficient to accommodate receipt of the nonvisible data stream within the projected image area.

An active screen typically includes plural cells, each with receivers corresponding to red, green, and blue channels of visible light. Those receivers may be associated with individual emitters, as well as a power supply and a ground to power the emitters and/or receivers. The emitters typically emit light in response to optically addressed image information projected onto the active screen, thereby forming an emitted image.

In addition to the receivers corresponding to red, green, and blue channels of visible light, one or more cells of the active screen may include receivers configured to detect nonvisible radiation, such as infrared radiation. These nonvisible radiation receivers may detect the nonvisible data stream generated by the projector. A separate nonvisible radiation receiver may be associated with each cell of the active screen. For example, in order to address potential alignment issues, a plurality of adjacent cells may define an array of nonvisible receivers which operate in parallel to provide increased spatial tolerance to positioning the nonvisible data stream. Alternatively, a single nonvisible receiver may be employed in a central cell of the plurality of adjacent cells, and a nonvisible data stream generated to substantially cover the plurality of adjacent cells. Furthermore, a nonvisible wavelength receiver may be associated with every other cell, or every tenth cell. The ratio of nonvisible receivers to cells may be selected for a particular application of the active screen. Alternatively, as described above with respect to passive display screens, one or more infrared receivers may be localized in close proximity to the display screen, for example, at the corners of the display screen, or along an edge of the display screen.

As depicted in FIG. 2, receiver array 48 may be in communication with an audio system 52 including speakers 54a and 54b. Projector 42 may project data including audio information to receiver array 48 via projection engine 10. The data may be serialized, converted from digital to analog, amplified and sent to speakers 54a,b so that the appropriate sound may accompany projected image 47. For example, where a multimedia presentation is sent to projector 42 from computer 46, the sound associated with the presentation may be played on audio system 52 as the video portion of the presentation is projected onto display surface 45 without the necessity of additional cables or other hardwire connections between computer 46 and audio system 52.

Figure 3:
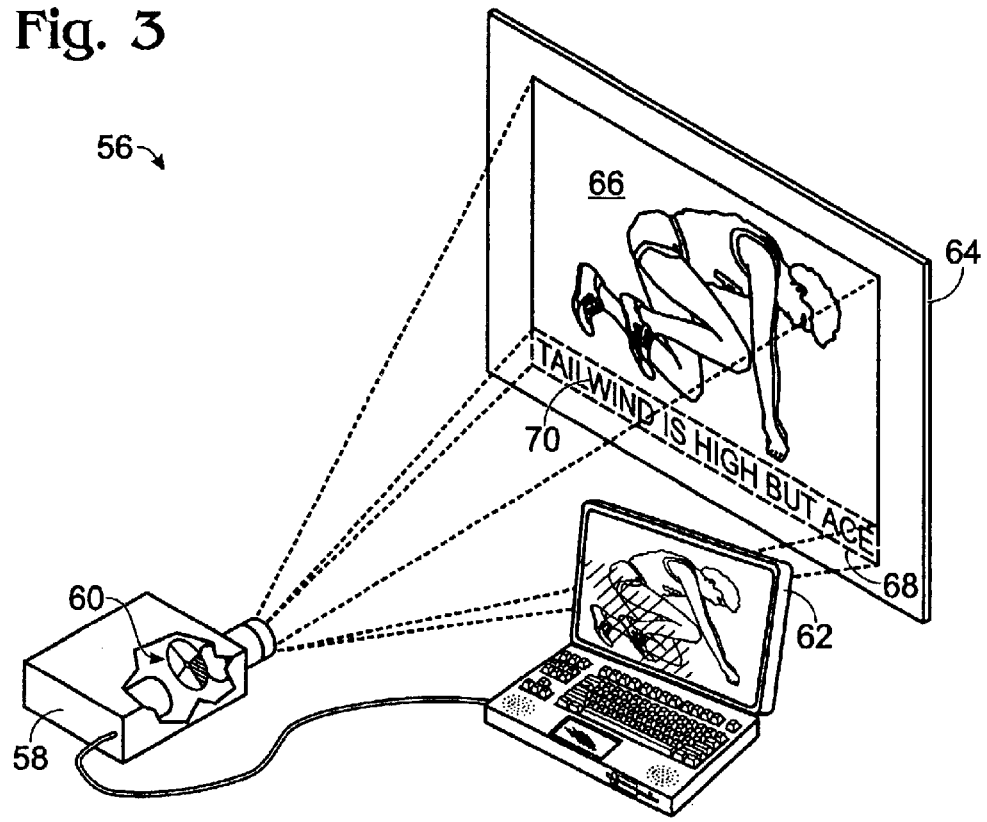
FIG. 3 is an isometric view of an alternative display system that includes the projection engine of FIG. 1

In FIG. 3, an emissive display system 56 is shown to include a projector 58 having a projection engine 60 as described above, an associated computer 62, and an active (or emissive) display screen 64. In the depicted embodiment, it will be appreciated that projection of the optically addressed visible image information onto the display screen generates an image 66 on display screen 64. Projection of the nonvisible data stream onto the display screen triggers generation of captioning 70 for emitted image 66.

As indicated above, the nonvisible data projected by projection engine 60 need not be spatially-oriented, or optically addressed. Rather, nonvisible radiation receivers may be localized in screen 64 in any configuration that provides for reception of the nonvisible data signal. For example, one or more receivers may be positioned along an edge 68 of the emitted image 66. While the receivers are typically located in an area of the screen accessible to projection engine 60, that area need not be used to display a visible image.

A variety of different types of information may be transmitted using the nonvisible data stream projected by projection engine 60. For example, the data encoded in the data stream may direct modification of the emitted image, or modification of some other operating characteristic of the display screen. In FIG. 3, the nonvisible data stream may be utilized to transmit closed-captioning data to display screen 64, resulting in generation of captioning 70. While captioning 70 is depicted as being generated along edge 68 of the emitted image, it should be stressed that such captioning may be the result of decoding of a non-spatially addressed data stream received from the projection engine, and corresponding activation of emitters in the screen based upon the decoded data stream.

Where nonvisible data is received along a lower edge of the projected image, as shown in FIG. 3, the nonvisible data stream may be projected by only a portion of the image-forming element. For example, only a portion of the bottom row or rows of a micromirror array may be active in generating the nonvisible data stream by modulating the beam generated by data segment 32.

The nonvisible data stream also may be used to configure the display surface. For example, the nonvisible data stream may include a directive to alter the aspect ratio of the screen (e.g. to transition between an aspect ratio of 16:9 and an aspect ratio of 4:3). Such an aspect ratio conversion may require the activation of shutters, blinders, and the like on either side of the display surface to alter the image area.

Alternatively, or in addition, the nonvisible data stream may be responsive to light level information for the room where the display system is located. For example, ambient light levels may be detected by a light sensor, and then transmitted to the display screen for optimization of the presentation with respect to the detected ambient light levels. Furthermore, the nonvisible data receiver may be associated with the room lighting, such that upon initiation of a presentation, a signal may be sent via the nonvisible data stream to automatically direct dimming of the room lights. Mechanical movement of the display surface, such as by raising or lowering the display screen, also may be initiated and/or controlled by the nonvisible data stream.

Where the display system includes portable, or mobile, receivers, it may be useful to include a calibration procedure in order to ensure that the receiver(s) are appropriately placed for reception of the projected nonvisible data stream. For example, the calibration routine may include the projection of a constant or repetitive nonvisible signal so that the receiver may be positioned so that acquisition of the nonvisible data signal is verified.

It should be appreciated that the display system described herein lends itself to a method of temporally sequencing a visible image and a nonvisible data stream as set out at 72 in FIG. 4. In particular, the method may include generating visible and nonvisible radiation at 74, sequencing the visible radiation and the nonvisible radiation at 76, modulating the visible radiation to generate a visible image at 78, modulating the nonvisible radiation to generate a nonvisible data stream at 80, projecting the visible image on a display surface at 82, and projecting the nonvisible data stream onto a receiver at 84.

Appropriate software or firmware instructions to effect the methodology described above may be employed via a computer-readable medium. A computer-readable medium, as used herein, can be anything that can contain, store, communicate, propagate, or transport instructions for use by, or in connection with, an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical).

The instructions on the computer-readable media may represent an upgrade to projector software previously available, in order to permit the execution of the above-described method, or to execute an upgraded version of such software.

The display system described herein permits data to be transmitted along with a visible image without interference with the image as displayed. A variety of content may be transmitted using the nonvisible data stream, resulting in presentations that offer enhanced control for the presentation audience.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims.

What is claimed is:

1. A display system comprising:
   an illumination source configured to produce visible and nonvisible radiation; and
   a modulator configured to modulate the visible radiation to generate a visible image and to modulate the nonvisible radiation to generate a nonvisible data stream.

2. The display system of claim 1, where the visible radiation and the nonvisible radiation are temporally sequenced.

3. The display system of claim 1, where the modulator includes a color-forming element and an image-forming element.

4. The display system of claim 3, where the color-forming element includes a color wheel.

5. The display system of claim 4, where the color wheel includes a red transmissive segment, a green transmissive segment, a blue transmissive segment, and an infrared transmissive segment.

6. The display system of claim 3, where the image-forming element includes a transmissive image-forming element.

7. The display system of claim 3, where the image-forming element includes a reflective image-forming element.

8. The display system of claim 7, where the image-forming element includes a micromirror array.

9. The display system of claim 1, where the nonvisible radiation includes infrared radiation.

10. The display system of claim 1, further comprising a receiver configured to receive the nonvisible data stream.

11. The display system of claim 10, where the receiver is included in the display surface.

12. The display system of claim 1, where the nonvisible data stream includes serial data.

13. The display system of claim 1, further comprising an optically addressed active display surface including optically addressed receivers configured to receive the nonvisible data stream.

14. A display system comprising:
an illumination source configured to produce visible and nonvisible radiation; and
a modulator configured to modulate the visible radiation to generate a visible image and to modulate the nonvisible radiation to generate a nonvisible data stream that includes audio data.

15. The display system of claim 1, where the nonvisible data stream includes image data.

16. The display system of claim 1, where the nonvisible data stream includes data related to a display system environment.

17. A projection engine, comprising:
at least one illumination source;
a color-forming element, configured to manipulate radiation from the at least one illumination source to define at least one visible band and at least one nonvisible band; and
an image-forming element configured to form a visible image using the visible band and to form a nonvisible data stream using the nonvisible band.

18. The projection engine of claim 17, where the color-forming element is a color wheel.

19. The projection engine of claim 17, where the image-forming element is a micromirror array.

20. The projection engine of claim 17, where the image-forming element is configured to form the nonvisible data stream by pulse modulation.

21. The projection engine of claim 17, where the color-forming element is configured to temporally sequence the visible band and the nonvisible band.

22. A method of temporally sequencing a visible image and a nonvisible data stream, the method comprising:
generating visible and nonvisible radiation;
sequencing the visible radiation and the nonvisible radiation using a modulator;
modulating the visible radiation to generate a visible image; and
modulating the nonvisible radiation to generate a nonvisible data stream.

23. The method of claim 22, further comprising projecting the visible image onto a display surface.

24. The method of claim 22, further comprising projecting the nonvisible data stream onto a receiver.

25. The method of claim 24, where the nonvisible data stream includes additional image data.

26. The method of claim 24, where the nonvisible data stream includes a plurality of parallel data streams.

27. The method of claim 24, further comprising serializing data from the plurality of nonvisible data streams after reception at the receiver.

28. A method of temporally sequencing a visible image and a nonvisible data stream, the method comprising:
generating visible and nonvisible radiation;
sequencing the visible radiation and the nonvisible radiation;
modulating the visible radiation to generate a visible image;
modulating the nonvisible radiation to generate a nonvisible data stream that includes audio data; and
projecting the nonvisible data stream onto a receiver.

29. A storage medium readable by a processor, having embodied therein a program of commands executable by the processor to:
modulate visible radiation to generate a visible image corresponding to received image data; and
modulate nonvisible radiation to generate a nonvisible data stream corresponding to received non-image data.

30. The storage medium of claim 29, the storage medium further having embodied therein a program of commands executable by the processor to sequence the visible radiation and the nonvisible radiation.

31. A display system, comprising:
means for producing visible radiation;
means for producing nonvisible radiation;
means for modulating the visible radiation to generate a visible image; and
means for modulating the nonvisible radiation to generate a nonvisible data stream.

32. A projector, comprising a projection engine that includes:
an illumination source that produces visible and nonvisible radiation;
a color-forming element configured to sequentially pass the visible and nonvisible radiation;
an image-forming element configured to receive the sequenced visible and nonvisible radiation, form a visible image using the visible radiation, and form a nonvisible data stream using the nonvisible radiation.

33. The projector of claim 32, wherein the color-forming element includes a color wheel.

34. The projector of claim 33, wherein the color wheel includes a red transmissive segment, a green transmissive segment, a blue transmissive segment, and an infrared transmissive segment.

35. The projector of claim 32, where the image-forming element includes a micromirror array.

* * * * *